Patented Nov. 12, 1929

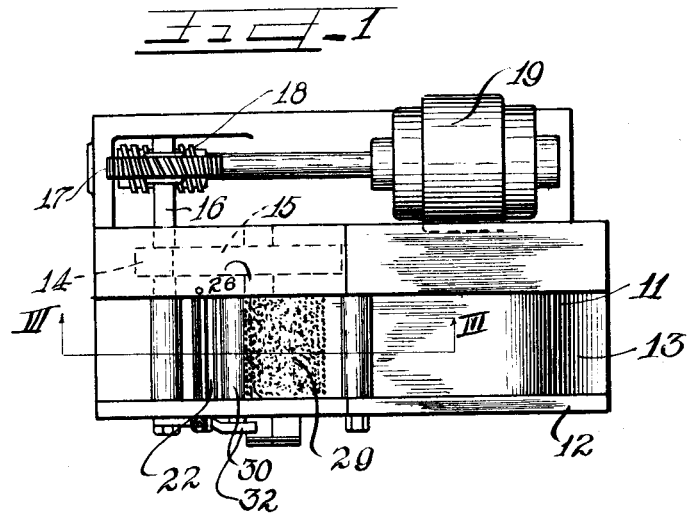
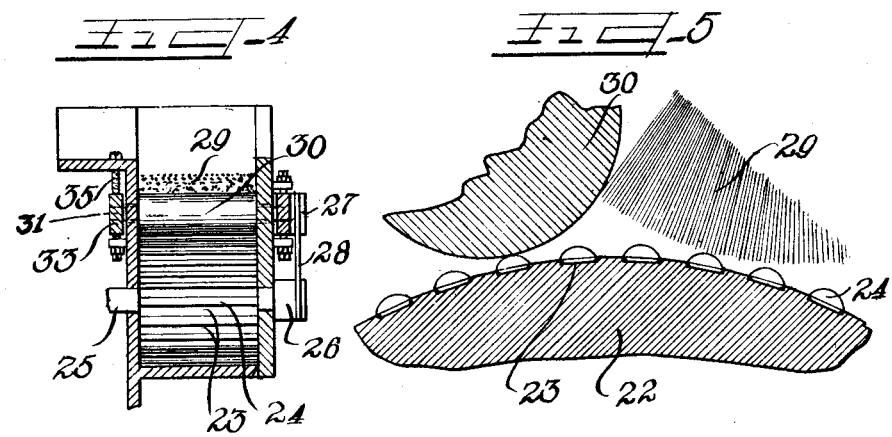

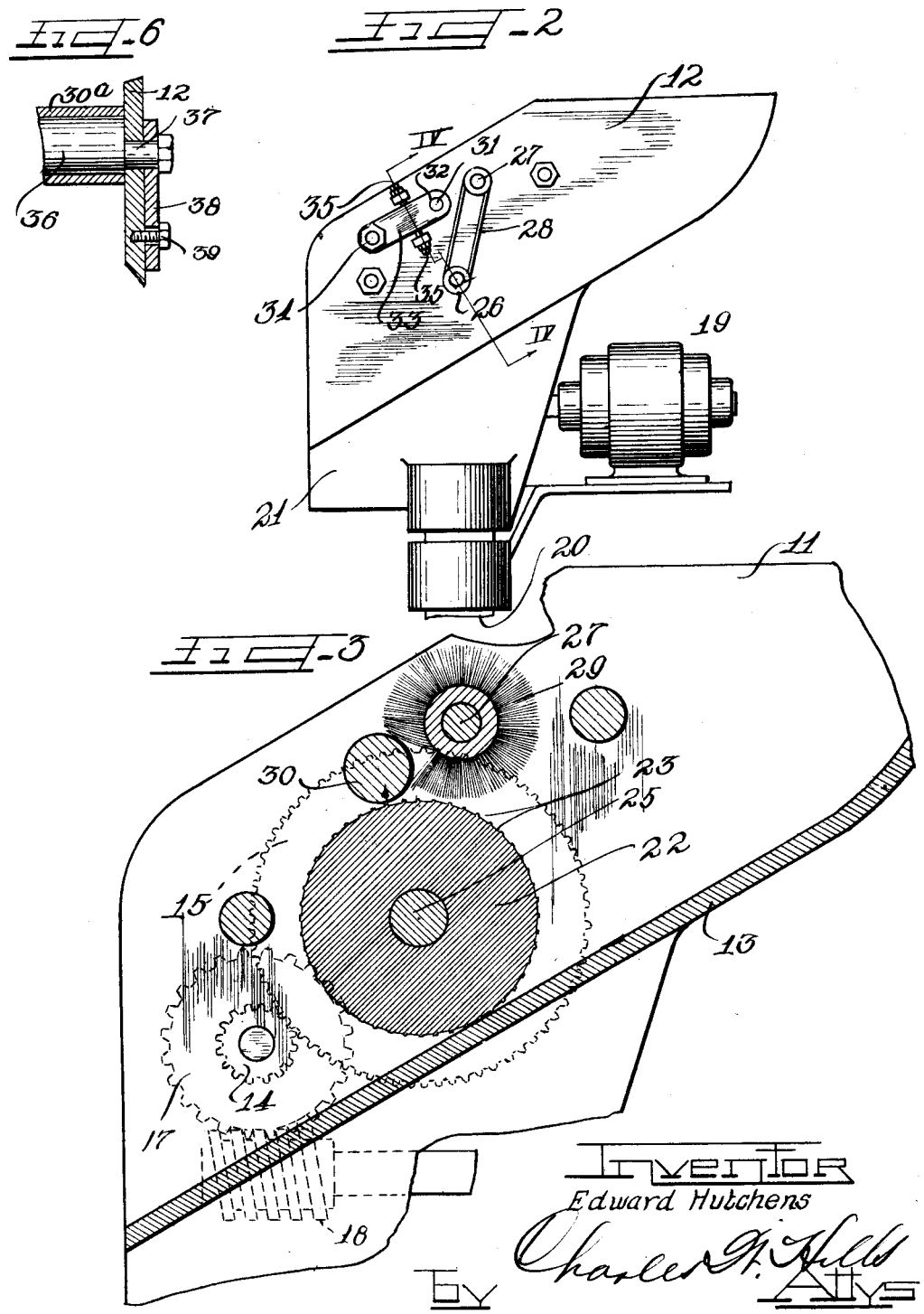

1,735,612

UNITED STATES PATENT OFFICE

EDWARD HUTCHENS, OF MILWAUKEE, WISCONSIN

WASHER-CONDITIONING MACHINE

Application filed November 1, 1926. Serial No. 145,693.

This invention relates to washer conditioning apparatus and has special reference to reducing rubber heel washers to an exact height suitable for machine distribution to the pins of a heel mold.

Heretofore I have successfully produced washer sorting and distributing apparatus which will face in a common direction and distribute washers into channels, but I have found that irregular thicknesses or depths of the concave washers commonly used in rubber heels causes occasional jamming of the distributing mechanism, burs on the washers, resulting from the punching operations, being a prolific source of this trouble in the commercial operation of washer distributing mechanism. I have therefore found it to be desirable to remove the burs or flatten the washers to a common depth to insure freedom from this trouble. As such washers run thousands to the pound, it is obviously practically a commercial impossibility to inspect and reject defective washers, so that it is an object of this invention to mechanically pick up washers in a predetermined position and while in this position passing them under a flattening roll adjustable to obtain the desired depth of washer. To produce this result I have provided a grooved drum to receive the rims of the washers, and if occasional washers are so badly defective as to jam in the grooves, they will stick therein and thereby be withheld from the washers discharged by the machine, thus providing an automatic inspection of the washers. These jammed washers can be removed at intervals involving only a momentary shut down of the machine.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a machine embodying the features of this invention.

Figure 2 is a front elevation thereof.

Figure 3 is an enlarged fragmentary section on the line III—III of Figure 1.

Figure 4 is a section on the line IV—IV of Figure 2.

Figure 5 is an enlarged fragmentary section showing the action of the grooved and flattening rolls and the back-sweeping brush.

Figure 6 is an enlarged fragmentary detail of a modified form of adjustment for the flattening roll.

As shown on the drawings:

An inclined trough is formed by the walls 11 and 12 and bottom 13, the wall 11 forming a gear case for a pair of spur reducing gears 14 and 15 shown in dotted lines in Figures 1 and 3, the pinion 14 being mounted on a shaft 16 which carries a worm gear 17 meshing with a worm 18 on the shaft of a driving motor 19 supported on a column 20 which also supports a downward extension 21 of the wall 11.

A roll 22 having a series of grooves 23 of a width to receive the rims of cup washers 24, is mounted on a shaft 25 journalled in the trough walls and this shaft carries the gear 15 on one end. The other projecting end carries a pulley 26 for driving a second shaft 27 by means of the round belt 28, this shaft 27 carrying a brush 29 in a position to sweep back washers not seated properly in the grooves of the roll 22. A presser roll 30 is mounted above the grooved roll and is adjustable with respect thereto in order to obtain the desired final washer height. Two methods of adjustment are shown in Figures 2 and 6 respectively. In Figure 2 the ends 31 of the roll are of reduced diameter and project through slots in the trough walls and are journalled at 32 in the free ends of arms 33 pivoted at 34. The position of the arms 33 determines the gap between the rolls 30 and 22 and is regulated by means of the screws 35 engaging either side of the arms 33. In Figure 6 the roll 30$^a$ rotates on an eccentric shaft 36, the ends 37 of which form journals in the walls of the trough and have levers 38 secured thereto to rotatably adjust the shaft 36, the levers being held in adjusted position by the cap screw 39 which passes through an elongated slot in the end of the lever.

It will be noted that the washers 24 are made of metal and are one of the well known types used in the manufacture of rubber heels to surround nail holes. These washers are punched from sheet stock and each comprise a cup-shaped member having what may be termed a rim and a crown. In my machine the rim of the washer is adapted to fit in one of the grooves or slots 23 of the roll 22 as is clearly shown in Figure 5 and the crown is adapted in the event that the washer is slightly oversize or burred to be engaged by the roller 30. That is to say, my machine is adapted to flatten the burred and oversize washers so as to cause all of the washers leaving the machine to be of substantially uniform thickness. In general, I might say that the shape or contour of the washers is not materially changed but that defective or oversize washers are flattened to the size that they should be so as to enable them to be distributed to the pins of a heel mold by a washer distributing machine with facility and without jamming of this machine.

In the operation of this device a considerable quantity of washers is dumped into the inclined trough above the grooved roll 22, which is rotated counter clockwise in Figure 3, carrying washers, which lodge in the grooves with their rim sides in the groove, up beneath the presser roll 30 which flattens any projecting burs as well as bringing all the washers to an even predetermined depth regardless of original variations due to varying thickness of stock or varying depths produced in the cupping or punching operation. The brush also rotates counter clockwise in close proximity to the grooved roll to sweep back or dislodge washers not seated in the grooves. After the washers pass under the presser roll, they drop out of the grooves and pass down the trough to a suitable receptacle.

I am aware that many changes may be made, and numerous details of construction may be varied through a wide range without departing from the principles of this invention, and I therefore do not purpose limiting the patent granted hereon, otherwise than necessitated by the prior art.

I claim as my invention:—

1. In a machine for conditioning rubber heel washers and the like, having a rim and a crown, a roller provided with a plurality of slots adapted to receive the rims of said washers and means adapted to engage the crowns of the washers in said slots to compress said washers to substantially a predetermined size.

2. In a machine for reducing washers to a predetermined size, a slanting trough-like receptacle for washers, a roll having a plurality of slots for receiving washers from said receptacle, said roll being mounted in and transversely of said receptacle and in the path of the washers therein, a brush mounted transversely of the receptacle and positioned to dislodge washers improperly seated in said slots in the roll, and a roller for flattening the washers in the slots of said roll.

3. In a machine for flattening washers to a predetermined size, a roll having a plurality of slots in its periphery for receiving washers to be flattened, means for delivering washers to said roll, and a roller for compressing the washers properly seated in said slots to a predetermined size.

In testimony whereof I have hereunto subscribed my name.

EDWARD HUTCHENS.